United States Patent [19]

Roantree et al.

[11] 3,925,654

[45] Dec. 9, 1975

[54] DIGITAL SINE WAVE SYNTHESIZER

[75] Inventors: James P. Roantree, West Hartford; John Saunders, East Hartford, both of Conn.

[73] Assignee: United Technologies Corporation, Hartford, Conn.

[22] Filed: May 13, 1974

[21] Appl. No.: 469,189

[52] U.S. Cl. .................. 235/197; 235/152; 328/14; 328/142
[51] Int. Cl.² ........................................ G06F 15/34
[58] Field of Search.............. 235/150.53, 152, 197; 328/14, 27, 142

[56] References Cited
UNITED STATES PATENTS

| | | | |
|---|---|---|---|
| 3,500,213 | 3/1970 | Ameau................................. | 328/14 |
| 3,636,337 | 1/1972 | Dietel et al. ........................ | 235/197 |
| 3,654,450 | 4/1972 | Webb.................................... | 235/197 |
| 3,657,657 | 4/1972 | Jefferson........................ | 235/197 X |

Primary Examiner—Malcolm A. Morrison
Assistant Examiner—Jerry Smith
Attorney, Agent, or Firm—Donald F. Bradley

[57] ABSTRACT

Drift components in the output of a gyro in a strapdown inertial navigation system are measured by modulating the speed of the gyro wheel in a sinusoidal manner. True angular motion components acting on the gyro are modulated in proportion to the modulation of the wheel speed, while drift components which act on the gyro and which are independent of true motion and wheel momentum are not modulated. By the use of a drift calculator or selected band-pass filters responsive to the modulated output from the gyro, the drift component and true angular motion component may be separated, and the navigation system may be compensated for drift. A unique linear-parabolic modulator produces a digital output equivalent to a sinusoid which may be used to modulate the gyro wheel speed in the appropriate manner.

3 Claims, 5 Drawing Figures

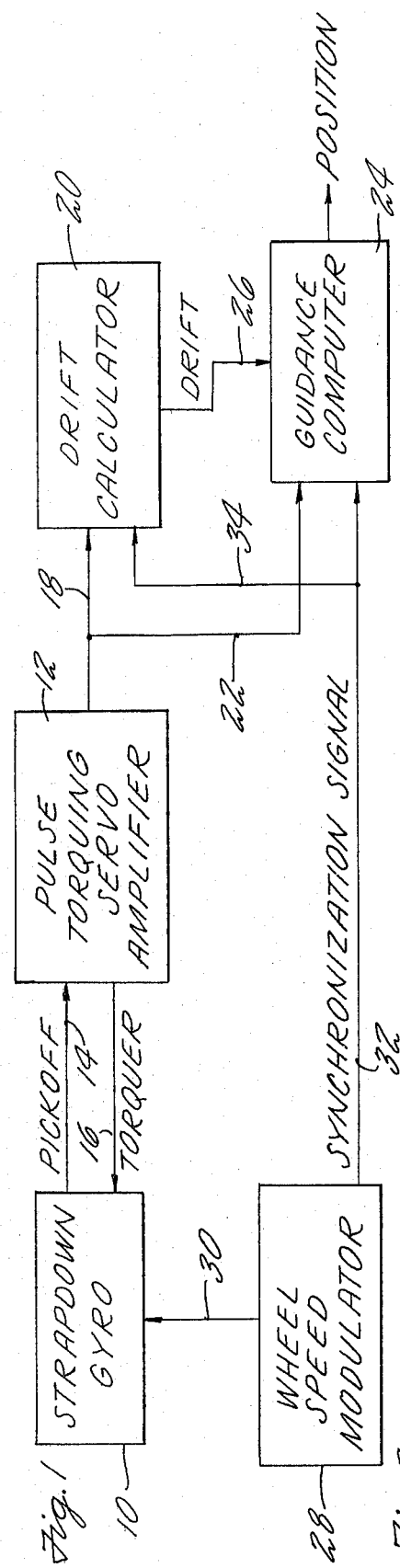
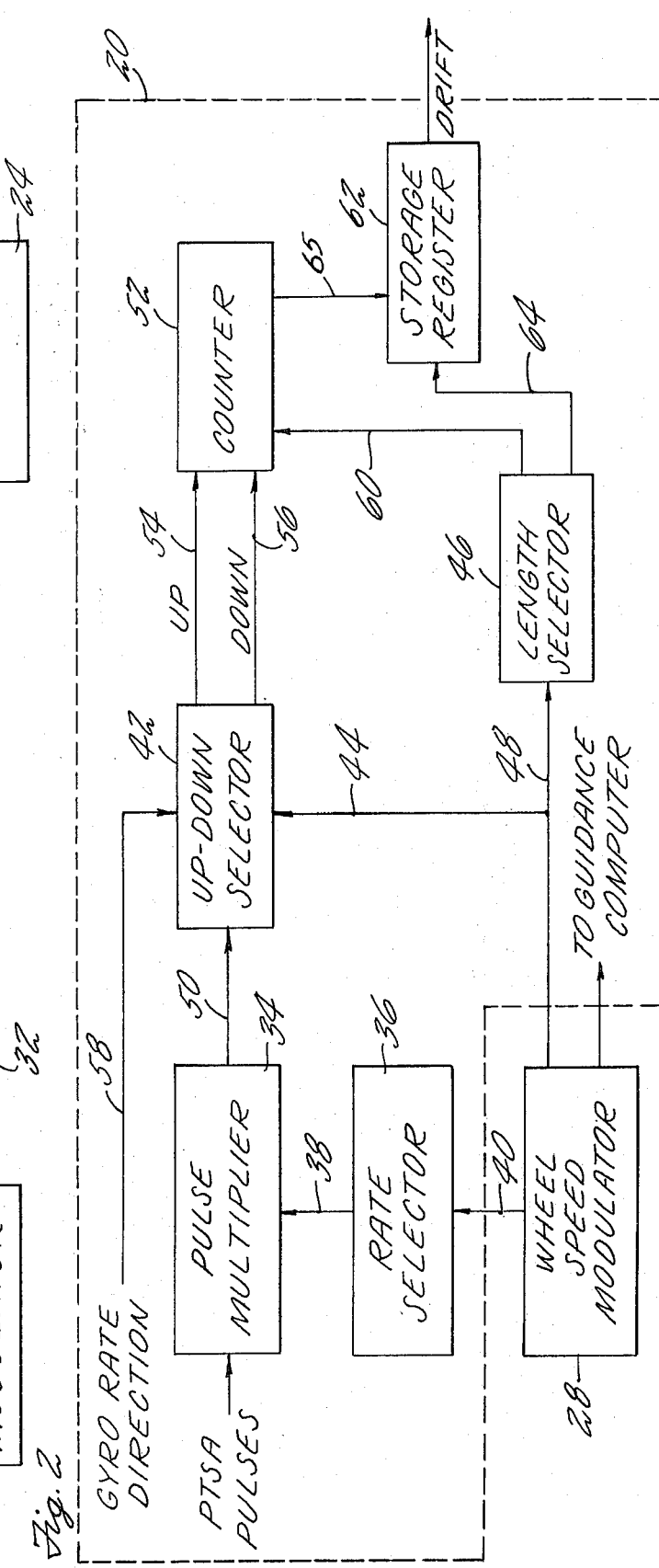

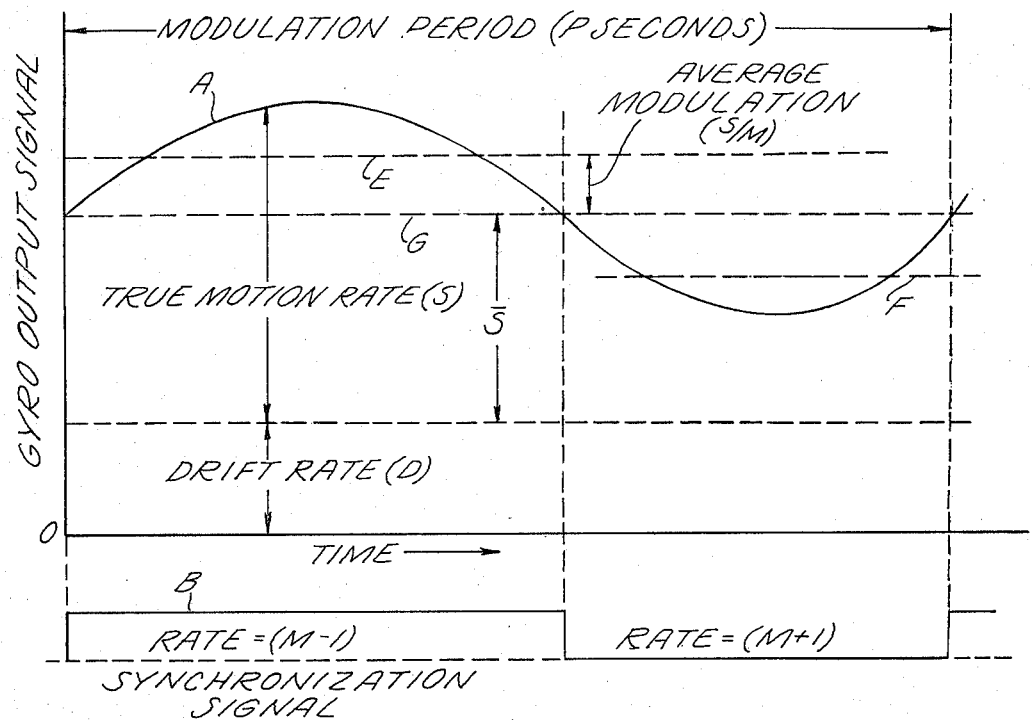

3,925,654

DIGITAL SINE WAVE SYNTHESIZER

CROSS-REFERENCES TO RELATED APPLICATIONS

This application contains subject matter related to the following two applications assigned to the same assignee:
1 Application Ser. No. 469,191, filed concurrently herewith for "Strapdown Gyro Drift Calculator" and
2 Application Ser. No. 469,190, filed concurrently herewith for "Drift Correcting Gyro System Using Filters."

BACKGROUND OF THE INVENTION

1. Field of the Invention

This invention relates to a system for measuring the drift of a gyro used in a strapdown inertial navigation system, and particularly to a system for modulating the angular momentum of the gyro wheel in a known manner in order to isolate the gyro drift components from the true angular rate components. A knowledge of gyro drift permits greatly improved accuracy in both alignment of the inertial system and performance of the navigation system.

2. Description of the Prior Art

Gimballed inertial measurement and navigation systems are able to eliminate azimuth drift caused by unbalances in the gyros by virtue of the extra degree of freedom inherent in the gimbals. Heretofore strapdown inertial measurement systems have been excluded from general commercial applications such as aircraft due to the high cost of obtaining low drift values relative to gimballed systems, although strapdown systems have proven to be desirable in space vehicles due to their simplicity and reliability.

The present invention provides a strapdown gyro system for use in inertial systems in which drift may be continuously or intermittently measured, and the system may be compensated for drift during operation. The principle of drift measurement is based on the fact that drift torques applied to the gyro are produced by mechanisms which are unrelated to the magnitude of the gyro angular momentum. By modulating the momentum, that is, modulating the speed of the gyro rotor wheel, a bias is imparted to the output of the gyro which can be used to separate drift from the true angular motion components. If the wheel speed is modulated in a carefully controlled, cyclic manner, drift can be measured to a relatively high accuracy, and the accuracy of the gyro measurements considerably improved.

The basic concept of separating gyro drift torque from the precession torque due to true angular motion by means of modulating the gyro angular momentum is known in the art, and has been implemented in inertial navigation systems in conjunction with rotating platforms. One prior art technique involves rotation of the gyro casing. This technique, however, modulates the direction of the gyro angular momentum vector in inertial space, while the magnitude of the gyro angular momentum remains constant. The direction of propagation of angular error due to gyro drift torque then becomes modulated at the rotation frequency, and this angular error is filtered in the navigation computations.

Another prior art technique is known which varies the magnitude of the angular momentum, but this latter technique is useful only with stable platforms, and the drift is not calculated. Rather, the true motion is obtained from the modulated component of the gyro output and fed back to the platform to null the true motion. This is necessarily a slow acting procedure, being limited by the rate of speed modulation, and is not useful for strapdown gyro giving attitude information.

The present invention is an improvement over the prior art systems and involves the modulation of the magnitude of the gyro angular momentum, not its vector direction, in order to achieve the error cancellation effect. Further, the cancellation is accomplished without disturbing the normal operational response characteristics of the closed loop in the strapdown gyro.

Another advantage of the present invention is the fact that rapid self alignment of the strapdown gyro inertial measurement unit can be performed, thereby eliminating the need for optical or other types of azimuth alignment from an external source in order to initiate the system for gyrocompassing.

The present invention is predicated upon the accuracy of the gyro wheel speed modulation and switching techniques. In order to produce the required accuracy and repeatability, and also to make the drift measurement scheme of the present invention compatible with currently available digital electronics, a unique digital sine wave synthesizer is also disclosed herein. While specifically adapted to gyro wheel speed modulation, the digital sine wave synthesizer has applicability to other devices unrelated to the present application.

SUMMARY OF THE INVENTION

In accordance with a preferred embodiment of the present invention, the angular momentum of the rotating wheel of a strapdown rate integrating gyro is cyclically modulated by varying the speed of the gyro wheel in a sinusoidal manner. Since the drift component of the gyro output signal is normally independent of true input rates, the drift component remains unmodulated while the true angular rate component is modulated in accordance with the applied wheel speed modulation. By numerically integrating the gyro output signal over one or more modulation periods, there results a quantity which is the product of the gyro drift and the modulation period, the latter being a known quantity. Once drift has been determined, alignment of the inertial system and/or correction of the navigation system can be accurately performed by known techniques.

In accordance with a futher embodiment of the present invention, band-pass and band-reject filters are used to filter the gyro output signal into its components of drift and true angular rate. Since the true angular rate components are modulated by the wheel speed modulation while the drift components are not, separation of the two components occurs when the proper frequency components are isolated.

In accordance with a still further embodiment of the present invention, a digital sine wave synthesizer is disclosed for producing the desired cyclic modulation to the gyro wheel speed. The sine wave is synthesized in a linear manner over its increasing and decreasing segments, and a parabolic function is generated to produce the change in direction of the sinusoid at its upper and lower limits of amplitude. The output is a binary equivalent of a sine wave rather than an analog signal level as commonly produced by prior art devices.

BRIEF DESCRIPTION OF THE DRAWINGS

FIG. 1 is a schematic drawing in block diagram form of the strapdown gyro wheel speed modulator and drift calculator of the present invention.

FIG. 2 is a schematic drawing in block diagram form of the drift calculator of FIG. 1.

FIG. 3 is a graph illustrating the sinusoidal gyro wheel modulation and its effect on drift and true input motion rate components of the gyro.

DESCRIPTION OF THE PREFERRED EMBODIMENT

Referring to FIG. 1, a standard rate integrating gyro 10 as installed in a strapdown inertial measurement system is shown. Strapdown systems differ from standard gimballed inertial systems in that the gyro is not permitted to move about gimbals when subject to an input torque, but the input torque is sensed as a result of changes in the gyro output signal and a feedback signal is fed to a torquing coil which produces a torque that counterbalances the input torque. The current in the torquing coil is a measure of angular rate, and the integral of current over a period of time, i.e., charge, is a measure of the angle of rotation itself.

Gyro drift results in a net torquing coil current in the absence of an angular rate input, and is produced by circuits which are responsive to the pickoff voltage which in turn results from the drift, as well as from mass unbalances, electronic defects, and other minor inaccuracies in the gyro and associated apparatus. If uncorrected, however, drift will cause inaccuracies in the gyro output which accumulate with time and which will result in gross errors in navigation systems.

The gyro motion in response to input rates is sensed by a pickoff connected with the gyro gimbal and an ac signal whose amplitude is proportional to gyro deflection is fed to a pulse torquing servo amplifier 12 via line 14. The amplifier 12 converts the ac signal to dc which is then chopped into a series of pulses of equal duration, the number of pulses during a selected time interval being proportional to the gyro deflection and thus proportional to the angular rate, i.e., the torque over the selected time interval. The series of pulses is fed back to the gyro torquing coil, not shown, via line 16.

The series of dc pulses is also fed via line 18 to a drift calculator 20, and via line 22 to a guidance computer 24. As will be explained in detail, the drift calculator extracts from the series of pulses fed to it from amplifier 12 the desired drift information which is then fed to computer 24 via line 26. Computer 24 acts on the gyro output information from line 22 and the drift information from line 26 to calculate the desired attitude and position navigation information. The guidance computer 24 and the calculations performed therein are well known and do not form a portion of the present invention.

As noted previously, the present invention is based on the fact that drift torques are produced by mechanisms that are unrelated to the magnitude of the gyro angular momentum. Thus, by modulating the momentum of the gyro rotor by applying a cyclic wheel speed modulation thereto, the drift component will remain unmodulated and can be separated from the modulated true motion component.

Figure 5:
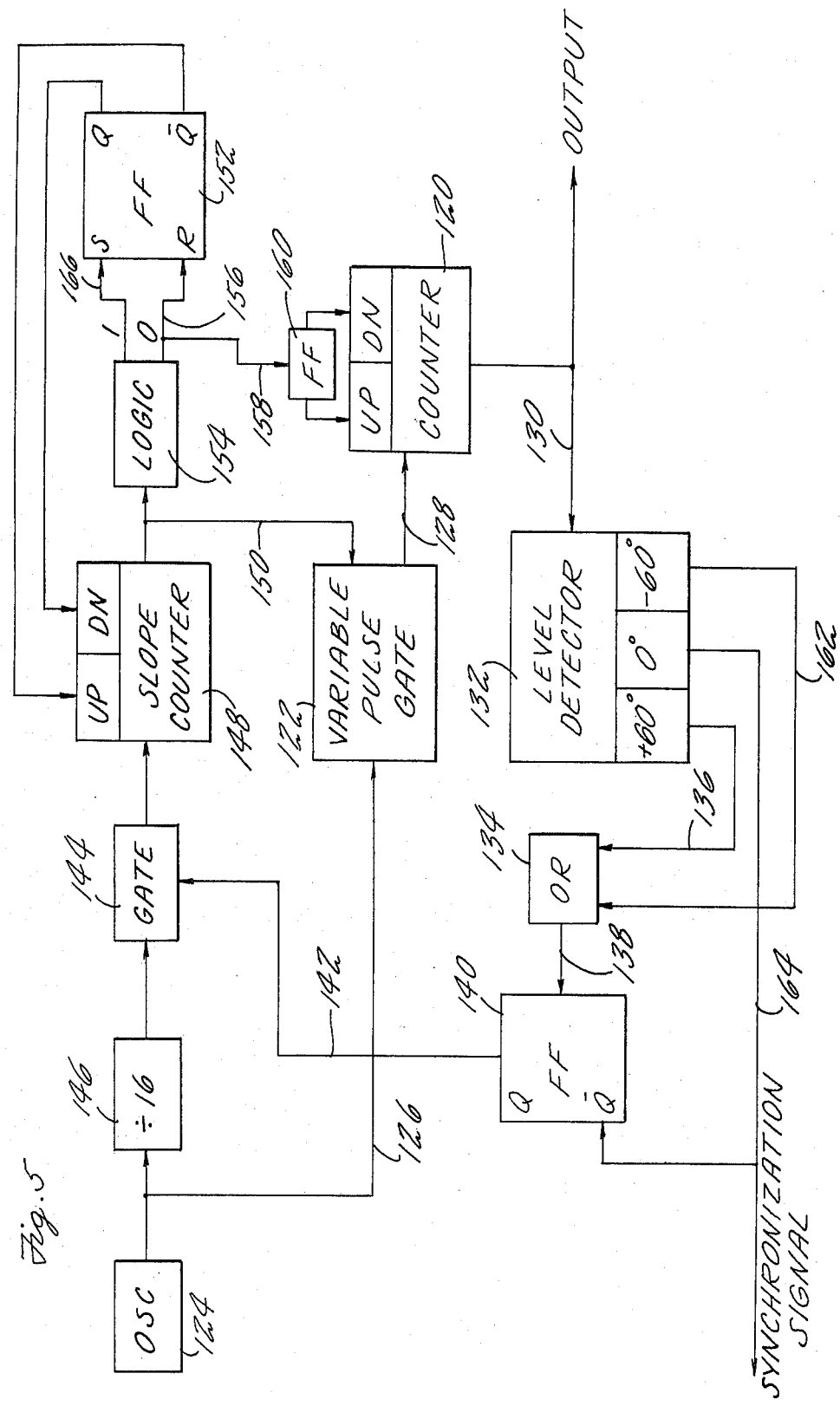
FIG. 5 is a schematic illustration of the digital sine wave synthesizer of FIG. 1.

In order to accomplish the desired wheel speed modulation there is shown in FIG. 1 a wheel speed modulator 28 which generates a cyclic output signal and feeds the signal via line 30 to the strapdown gyro 10 where the wheel speed is modulated in response to the modulation signal. In its broadest application any well-known analog waveform generator may be used, and its output may be any stable and repeatable cyclic modulation waveform which is fed to the drive motor for the gyro rotor and which is normally converted to a frequency signal since the drive motors are generally polyphase. In order to practice the present invention in its preferred form, however, the digital sine wave synthesizer of FIG. 5 is desirable since it is specifically adapted to produce its sinusoidal output in a digital form which matches the limitations of gyro wheel motors, and at high resolution and repeatability.

Regardless of the type of wheel speed modulator used in the embodiment of FIG. 1, a synchronization signal must be fed from modulator 28 to the guidance computer 24 via line 32 and to drift calculator 20 via line 34 in order to synchronize the gyro output with the modulation applied thereto. The synchronization signal need not be identical to the modulation waveform, but must at least be a two level signal indicative of the direction of the modulation signal, i.e., either increasing or decreasing wheel speed.

Referring to FIGS. 2 and 3 there is shown a preferred embodiment of the drift calculator 20 of FIG. 1. Assuming that the wheel speed modulator generates a sinusoidal waveform such as by using the digital sine wave synthesizer of FIG. 5 or an equivalent device, the gyro wheel speed will also be modulated sinusoidally. FIG. 3 shows by waveform A the effect of the sinusoidal modulation which is applied to the gyro wheel speed over one cycle of the modulation period P, a typical period P being 15 seconds. The gyro output signal will contain a drift rate component D which does not vary with wheel speed modulation, and a true motion rate component S as modulated by the wheel speed modulator. The true motion rate component may be, for example, earth rate. The resultant gyro output signal shown by waveform A is represented as an analog signal, but in fact is a series of pulses from the pulse torquing servo amplifier 12 of FIG. 1, the frequency of the pulses over each of a plurality of incremental periods being indicative of the angular motion. It should be noted that FIG. 3 shows both the drift component D and true motion component S as being in the same direction with respect to the gyro output signal, but it is just as likely that the two components will act in opposite directions.

The component S is due to a true angular motion which is assumed to be constant over the period of the computations. The resultant signal from the component S may therefore be averaged over the individual half periods of the modulation. This process is represented by the dotted lines E and F. The deviation of the lines E and F from the mean value, dotted line G, is given as $\overline{S}/M$ in which $\overline{S}$ is the mean value of the component due to the true rate and M is a quantity mathematically obtained by averaging the change in wheel speed produced by the wheel speed modulator over one half period. The component shown by line E is then equal to $\overline{S} + \overline{S}/M$, and the component shown by line F is equal to $\bar{S} - \bar{S}/M$.

It will be shown that by multiplying the value of the gyro output signal shown by waveform A by a number less than the modulation index M over the first or positive half cycle, and then multiplying the value of the gyro output signal by the same number more than the modulation index M over the second or negative half cycle, the difference between the two products will be proportional to drift. As illustrated below, the components of the gyro output signal are multiplied by the numbers M−1 and M+1 over the first and second half cycles respectively.

Gyro output signal = $P/2[-(M-1)(\bar{S} \cdot \bar{S}/M \cdot D)] + P/2[(M+1)(\bar{S}-\bar{S}/M \cdot D)]$
Gyro output signal = $P/2[-(M-1)(\bar{S} \cdot \bar{S}/M \cdot D) + (M+1)(\bar{S}-\bar{S}/M+D)]$
Gyro output signal = $P/2[-\bar{S}M-\bar{S}-MD \cdot \bar{S} \cdot \bar{S}/M \cdot D + \bar{S}M-\bar{S}+MD \cdot \bar{S}-\bar{S}/M \cdot D]$
Gyro output signal = $P/2 [2D]$
Gyro output signal = $PD$ Obviously if the drift calculator 20 is implemented by hardware, the modulation index M must be an integer, but for software versions any value of modulation index may be used. A similar definition of M may be used in which the multiplying factors (M−1 and M+1) differ by other than two in order to increase the number of choices of modulation waveform.

FIG. 2 shows one implementation of the drift calculator. The gyro output pulses from pulse torquing servo amplifier 12 are fed to a pulse multiplier 34 where they are multiplied at a rate determined by rate selector 36 connected to pulse multiplier 34 via line 38. The rate may be preselected by rate selector 36, or may be calculated therein as a function of the modulation index M. In order to trigger the rate selector 36, a synchronization signal shown as waveform B in FIG. 3 is fed to rate selector 36 from wheel speed modulator 28 via line 40. One apparatus for producing the synchronization signal will be shown in FIG. 5. Where required the wheel speed modulator will be adjusted or designed to produce a modulation index M which is an integer. The synchronization signal is also fed to an up-down selector 42 via line 44, and to a length selector 46 via line 48.

The gyro output signal pulses after multiplication in multiplier 34 are fed to selector 42 via line 50, and passed therethrough to counter 52 on lines 54 or 56 depending on the direction of the synchronization signal on line 44, that is, the synchronization signal determines whether the pulses should be counted up or down in counter 52. Also shown as an input to up-down selector 42 is a gyro rate direction signal on line 58 which is a two level signal and indicates the instantaneous sign of the uncorrected gyro output signal, that is, whether the gyro angular rate is clockwise or counterclockwise. The up-down selector 42 will act as an exclusive OR circuit in order to pass the multiplied pulses to the proper UP or DOWN lines 54 or 56 as a function of both the synchronization signal and the gyro angular rate direction, thus determining with respect to both the direction of the modulation and the direction of the angular rate the ultimate direction of the drift component.

Counter 52 sums the counts from the UP and DOWN lines and performs the algebraic subtraction to compute the remainder which is proportional to drift. The counter may be a digital computer.

Length selector 46 is preset or adjusted to determine the number of modulation periods P over which the drift computations are made, and will count the up and down excursions of the synchronization signal from line 48 until the proper number is achieved. At the same time the length selector 46 will send a signal via line 60 to clear the counter 52 at the end of each period, and instruct a storage register 62 via line 64 to load therein the drift computation from counter 52 via line 65 before the counter is cleared. Storage register 62 acts as a storage for the drift measurements until required by the guidance computer 24. The period term P appearing as a constant in the drift computation may be eliminated at any desired stage of the computations, but is preferably done in guidance computer 24 which receives as an input thereto the synchronization signal which is directly related to the period P.

Figure 4:
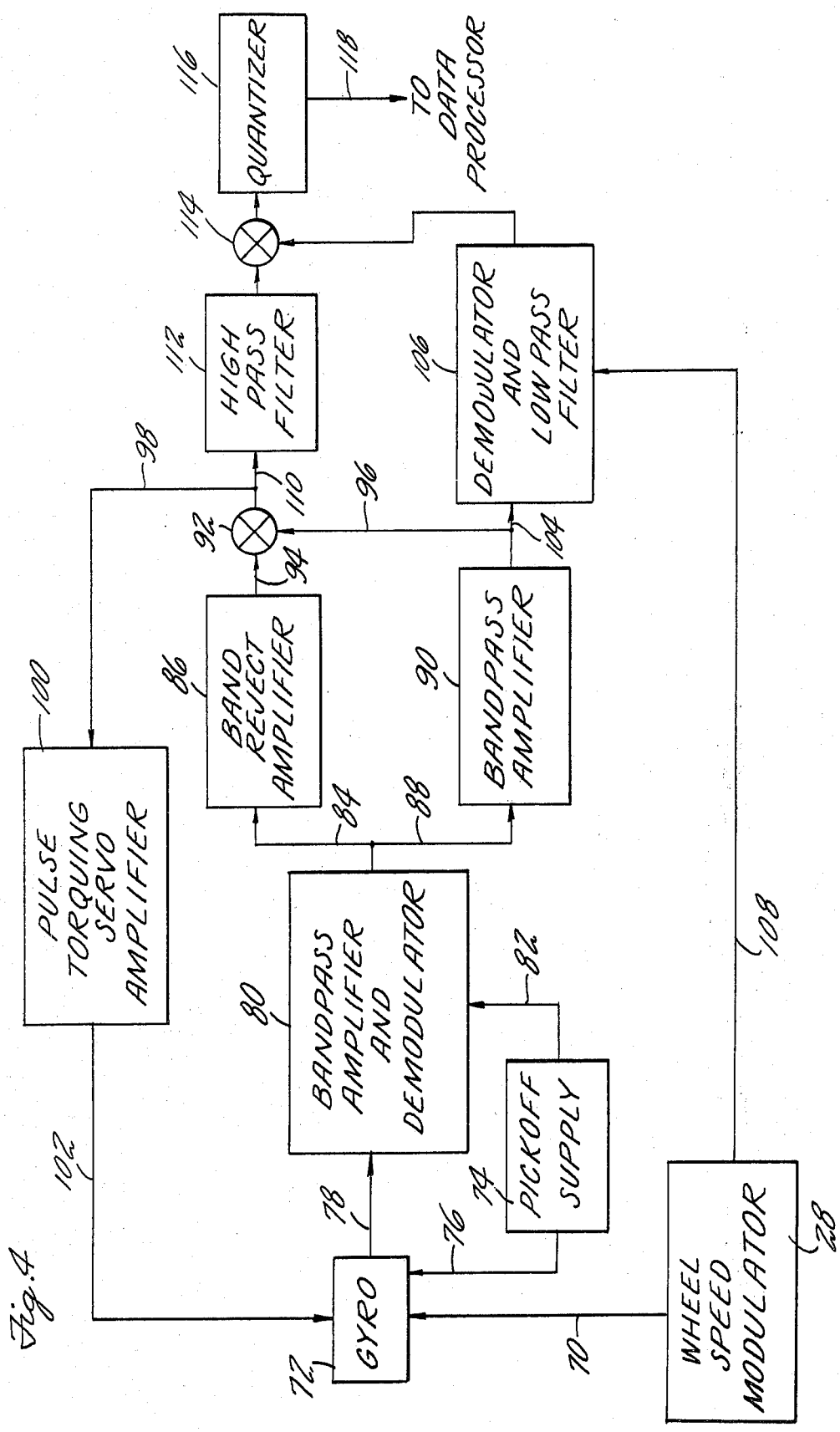
FIG. 4 is a schematic drawing in block diagram form of the use of filtering components to isolate the drift and true input motion rate components of the modulated gyro output signal.

FIG. 4 shows the use of band-pass and band-reject filters in the feedback loop of the pulse torquing servo-amplifier to accomplish drift rejection. This technique may be used in place of the embodiment of FIG. 2. In the embodiment of FIG. 4, drift and true angular motion may be separately detected, thus providing drift free information to the guidance computer.

Referring to the Figure, the wheel speed modulator 28 generates a sinusoidal waveform such as by using the digital sine wave synthesizer of FIG. 5 or an equivalent device. The sinusoidal waveform is fed via line 70 to gyro 72 where the gyro wheel speed will also be modulated sinusoidally. A gyro pickoff supply 74 supplies an excitation frequency to the gyro pickoff, not shown, via line 76. The output signal produced at the gyro pickoff will consist of a drift rate component which does not vary with wheel speed modulation, and a true motion rate component as modulated by the wheel speed modulator 28, both components in turn being modulated at the pickoff excitation frequency of pickoff supply 74. The output signal from the gyro pickoff is fed via line 78 to a band-pass amplifier and demodulator 80. The excitation frequency of the gyro pickoff is also fed to the band-pass amplifier and demodulator 80 from pickoff supply 74 via line 82. The band-pass amplifier and demodulator 80 is tuned to the pickoff excitation frequency so that its output is proportional to the constant drift rate component and the wheel speed modulated true motion rate component.

The output signal from the band-pass amplifier and demodulator 80 is fed through two parallel paths, one via line 84 to a band-reject amplifier 86 which is tuned to the wheel speed modulation frequency, and the other via line 88 to a band-pass amplifier 90 also tuned to the wheel speed modulation frequency. The output signal from the band-reject amplifier 86 will be proportional to the constant drift rate component and the unmodulated true motion rate component, whereas the output signal from the band-pass amplifier 90 will be proportional to the wheel speed modulated true motion rate component. current Since the strapdown gyro feedback system must be balanced for all inputs to the gyro 72, the separated components from amplifiers 86 and 90 are recombined in a summing junction 92. The output from band-reject amplifier 86 is fed to summing junction 92 via line 94, and the output from the band-pass amplifier 90 is fed to summing junction 92 via line 96. The resultant signal from the summing junction is then fed via line 98 to the pulse torquing servo amplifier 100 and its output is fed via line 102 to the strapdown gyro torquer contained in gyro 72. While not shown in the Figure, the pulse torquing servo amplifier 100 consists of a quantizer and a current switching bridge which derives a time modulated, constant cirrent square wave signal which appears on line 102. In practice, the switching of the square wave signal from minus to plus is controlled by a prescribed clock rate, typically 1 KHz, whereas the switching from plus to minus is determined by a comparison of the feedback signal with a sawtooth waveform that is synchronized with the prescribed clock rate.

The output signal from band-pass amplifier 90 is also fed via line 104 to a demodulator and low pass filter 106. The output from the wheel speed modulator 28 is also fed via line 108 to the demodulator and low pass filter 106. The demodulator and low pass filter 106 is tuned to the wheel speed modulation frequency, and its output is proportional to the low frequency component of the true motion rate. Although shown in FIG. 4 as a single component, the demodulator and low-pass filter 106 are preferably two separate circuits, the demodulator being synchronized at the wheel speed modulation frequency to produce a dc signal proportional to the true motion rate component, and any high frequency components in the dc signal being eliminated by the low-pass filter. The higher frequency components of the true motion rate are obtained by passing the signal from summing junction 92 via line 110 to a high pass filter 112 which rejects the constant drift rate and wheel speed modulated components in the signal. The output from high pass filter 112 is fed to a summing junction 114 where it is combined with the output from the demodulator and low pass filter 106 to produce a signal representing the output from a drift free gyro. The output signal from summing junction 114 is then digitized by passing it through a quantizer 116 which is typically synchronized with the pulse torquing servo amplifier 100 at a 1 KHz clock rate. The output signal from the quantizer 116 appearing on line 118 is typically a train of pulses representing increments of true motion angular changes. This signal is then fed to the data processor which may be the guidance computer 24 of FIG. 1.

FIG. 5 describes the novel linear-parabolic wheel speed modulator for digitally synthesizing a sine wave. The device may be used in conjunction with the embodiments of FIGS. 2 and 4, and also may be used wherever a digitally synthesized sine wave is desired. The gyro wheel speed modulation must have high stability and match the limitations of gyro wheel motors. In practice sufficient stability can only be achieved through digital circuits driven from a stable crystal controlled oscillator. One limitation on the gyro wheel speed is its acceleration and deceleration which must be closely regulated when practicing the present invention. Rate of change of acceleration is also important. The linear-parabolic wheel speed modulator disclosed herein provides definite limits independently to both the acceleration and acceleration rate coefficients of the wheel speed.

The synthesizer of FIG. 5 comprises a main counter 120 for counting the number of pulses supplied thereto through a variable pulse gate 122 from an oscillator clock 124. Feedback control logic is incorporated which causes the digital output from the main counter 120 to vary sinusoidally as a function of time. The digital output from the main counter 120 is, in its preferred embodiment, a twelve bit digital word. The sinusoidal variation of the output is not in fact a pure sinusoid, but is an approximation achieved by combining a time varying linear variation with a time varying parabolic variation.

Assuming a point in time equivalent to zero degrees of a sinusoid, oscillator 124 is generating pulses at a frequency of about 1 KHz which are fed through line 126 to the variable pulse gate 122 which at this time is set to pass therethrough all the pulses appearing on line 126. These pulses are then fed to counter 120 via line 128, the counter being counted upwardly from an initial base count which may be other than zero. The count in the counter 120 is fed via line 130 to a level detector 132 where there is stored a count value equivalent to the value which the sinusoid would have at approximately +60° of rotation. This will hereinafter be referred to as the 60° level. When the value of the counter 120 reaches the value stored in level detector 132, an output signal is fed to OR circuit 134 via line 136. The OR circuit 134 feeds a signal via line 138 to flip flop 140 to switch it from its reset state to its set state. When flip flop 140 is set, it feeds a signal via line 142 to gate 144 which opens the gate and allows the pulses from oscillator 124 to pass through a divide by 16 circuit 146 and through gate 144 to a slope counter 148, i.e., one out of each sixteen pulses from oscillator 124 is passed to slope counter 148. At this time the slope counter 16 has been set to contain its maximum count of binary 15 (there are 16 possible counts between binary 0 and binary 15). When slope counter 148 contains its maximum count, a signal is fed to variable pulse gate 122 via line 150 which causes variable pulse gate 122 to pass therethrough all the input pulses it receives on line 126. Assuming that the slope counter 148 is conditioned to count down as a result of the set condition of flip flop 152, slope counter will slowly count down each time it receives a pulse from gate 144. As slope counter 148 counts down, the signal on line 150 causes variable pulse gate 122 to pass therethrough one less pulse for each increment that slope counter 148 has been reduced, i.e., when slope counter 148 contains a count of fourteen, the variable pulse gate will pass only fifteen of the sixteen pulses fed on line 126, and when the slope counter contains a count of thirteen, the variable pulse gate will pass only fourteen of the sixteen pulses, and so on until slope counter reaches zero. During this time interval variable pulse gate 122 passes fewer and fewer of the oscillator pulses to counter 120. The divide by 16 circuit 146 causes 16 oscillator pulses to be passed to the variable pulse gate 122 for each pulse that is passed to slope counter 148, and as the slope counter counts down, fewer of the pulses reach counter 120 so that as a function of time it counts up at a slower rate, the count in counter 120 as a function of time approaching the rounding off of the tip of a sinusoid.

When slope counter 148 reaches a count of zero, this condition is sensed by logic circuit 154 and a signal is fed via line 156 to flip flop 152 to cause the flip flop 152 to reset and causes the slope counter 148 to switch from counting downwardly to counting upwardly. The signal on line 156 is also fed to flip flop 160 via line 158 to cause it to reverse and switch the main counter 120 from counting upwardly to counting downwardly.

Slope counter now begins to count upwardly from zero in response to pulses from gate 144. The variable pulse gate 122 initially passes only one of every 16 pulses on line 126 to counter 120 which now begins to count downwardly. As slope counter 148 counts upwardly, the number of pulses passing through variable pulse gate 122 gradually increases and the count in main counter 120 decreases at a faster rate in a fashion similar to its upward count. This action continues until the level detector 132 detects that the value in counter 120 is equivalent to approximately 120° of the sinusoid, or the same value in the counter 120 as the 60° level of the sinusoid, at which time a signal is fed via line 136 to OR circuit 134 causing flip flop 140 to be reset and thereby blocking gate 144. Thereafter all pulses applied by oscillator 124 on line 126 to variable pulse gate 122 are passed to main counter 120 and linear downward counting is resumed.

Once the median level of the sinusoid is reached, level detector 132 senses that counter 120 has reached a count equivalent to the zero level of the modulation and generates a signal on line 164 which, assuming that it is a two level signal, may be used as the synchronization signal by the drift calculators described previously. Counter 120 need not count negatively, but can be preset to a positive count equivalent to zero degrees of the sinusoid, all positive and negative excursions of the sinusoid being represented by positive numbers. The synchronization signal on line 164 may also be applied to flip flop 140 to insure that it will be in its reset state during the next counting period, and will become set when the next 60° level of the sinusoid is reached.

At the median level of the sinusoid, slope counter 148 contains its maximum count, which state is sensed by logic circuit 154 and a signal is sent via line 166 to flip flop 152 causing it to become set and switching slope counter to count downwardly. Counter 120 will remain in its downward counting mode. When the counter 120 counts downwardly to the −60° (240°) level of the sinusoid, level detector 132 again actuates OR circuit 134 which sets flip flop 140 and opens gate 144. Slope counter 148 now counts downwardly from 15 to 0, and the number of pulses through variable pulse gate 122 to counter 120 is decreased as before until slope counter 148 reaches a count of zero. At this time a signal from logic circuit 154 via line 156 resets flip flop 152 causing slope counter 148 to switch to counting upwardly, and flip flop 160 is reversed causing main counter 120 to count upwardly again so that it can complete the sinusoid. Slope counter 148 then begins its count from zero to fifteen at which time gate 144 is closed and the remaining linear portion of the sinusoid is achieved in counter 120.

The output from the counter 120 on line 130 may be fed to a digital to analog converter, not shown, to convert the binary output to an analog value which is fed to the gyro wheel drive motor. Frequency conversion may also be required depending on the type of drive motor, for example, by use of a binary rate multiplier circuit.

While the present invention has been described with respect to its preferred embodiments, it is apparent that changes may be made to the components and their combination without departing from the scope of the invention as hereinafter claimed.

We claim:
1. A digital sine wave synthesizer comprising
an oscillator for producing a series of timed pulses,
a variable pulse gate circuit connected to receive said series of oscillator pulses and to pass therethrough a variable proportion of said series of pulses,
a main counter connected with said variable pulse gate circuit for counting the pulses passed thereto by said variable pulse gate circuit,
a level detector connected to said main counter and responsive to a preselected count therein for producing a gating signal,
a divider circuit having an input connected to receive said oscillator pulses and to produce a series of output pulses equivalent to the number of oscillator pulses received at the input thereof divided by an integral number,
a gate circuit connected to receive the series of output pulses from said divider circuit,
a slope counter circuit connected to said gate circuit,
means for connecting said gating signal to said gate circuit to actuate said gate circuit and permit the passage of said series of output pulses therethrough to said slope counter circuit, said slope counter circuit counting the pulses supplied thereto by said gate circuit,
means for connecting said slope counter circuit with said variable pulse gate circuit to cause said variable pulse gate circuit to vary in response to the count in said slope counter circuit the proportion of pulses passed therethrough to said main counter,
means responsive to a preselected count in said slope counter for reversing the direction of count in said slope counter and in said main counter,
and means connected with said main counter for producing an output signal.

2. A digital sine wave synthesizer comprising
oscillator means for generating a series of timed pulses,
a counter connected to said oscillator means for receiving and counting said series of pulses,
logic means responsive to a preselected first count in said counter for gradually reducing in a preselected pattern the number of timed pulses fed to said counter during successive time periods,
means responsive to a condition of operation of said logic means for reversing the direction of counting of said counter and causing said logic means to gradually increase according to said preselected pattern the number of timed pulses fed to said counter during successive time periods,
and means including said logic means responsive to a preselected second count in said counter for inactivating said logic means.

3. A method for synthesizing a sine wave comprising the steps of
generating a series of timed pulses,
counting said series of timed pulses in a counter,
sensing the attainment of a first selected count in said counter and continuously reducing during successive time periods the number of pulses fed to said counter until the number of pulses fed to said counter is zero,
reversing the direction of count in said counter and continuously increasing during successive time periods the number of pulses fed to said counter until said counter again attains said first selected count,
sensing the attainment of a second selected count in said counter and continuously reducing during successive time periods the number of pulses fed to said counter until the number of pulses fed to said counter is zero,
and reversing the direction of count in said counter and continuously increasing during successive time periods the number of pulses fed to said counter until the counter again attains said second preselected count.

* * * * *

UNITED STATES PATENT OFFICE
CERTIFICATE OF CORRECTION

PATENT NO. : 3,925,654
DATED : December 9, 1975
INVENTOR(S) : James P. Roantree and John Saunders It is certified that error appears in the above-identified patent and that said Letters Patent are hereby corrected as shown below:

Column 5, lines 13-20, should read:

$$\text{--Gyro output signal} = P/2 \left[-(M-1)(\overline{S}+\overline{S}/M+D)\right] + P/2 \left[(M+1)(\overline{S}-\overline{S}/M+D)\right]$$

$$\text{Gyro output signal} = P/2 \left[-(M-1)(\overline{S}+\overline{S}/M+D) + (M+1)(\overline{S}-\overline{S}/M+D)\right]$$

$$\text{Gyro output signal} = P/2 \left[-\overline{S}M-\overline{S}-MD+\overline{S}+\overline{S}/M+D + \overline{S}M-\overline{S}+MD+\overline{S}-\overline{S}/M+D\right]$$

$$\text{Gyro output signal} = P/2 \left[2D\right]$$

$$\text{Gyro output signal} = PD\text{--}$$

Column 6, line 56, cancel "current"

Column 7, line 1, "cirrent" should read --current--

Column 8, line 54, "tip" should read --top--

Signed and Sealed this twenty-third Day of March 1976

[SEAL]

Attest:

RUTH C. MASON
Attesting Officer

C. MARSHALL DANN
Commissioner of Patents and Trademarks